Nov. 2, 1965   G. G. BONVALLET ETAL   3,215,828
COMBINATION SPACE LIGHTING, HEATING AND VENTILATING FIXTURE
Filed May 31, 1963

INVENTORS.
Gordon G. Bonvallet
BY   Richard Dulude

Clarence R. Patty, Jr.
THEIR ATTORNEY

United States Patent Office 3,215,828
Patented Nov. 2, 1965

3,215,828
COMBINATION SPACE LIGHTING, HEATING
AND VENTILATING FIXTURE
Gordon G. Bonvallet, Corning, and Richard Dulude,
Horseheads, N.Y., assignors to Corning Glass Works,
Corning, N.Y., a corporation of New York
Filed May 31, 1963, Ser. No. 284,605
5 Claims. (Cl. 240—9)

This invention relates to lighting fixtures incorporating means for controlling the disposition of heat radiated therefrom in order to regulate the temperature and circulation of air in a space illuminated thereby.

An object of this invention is the provision of a fixture capable of performing singly or in combination the functions of lighting, ventilating, heating or cooling of space.

These and other objects which will be apparent from the description are accomplished by the provision of a fixture comprising a light source, a light transmitting panel having an electrically conducting heat-reflecting coating thereon, means for applying an electrical potential across the coating and means for providing circulation of air through the fixture.

Figure 1:
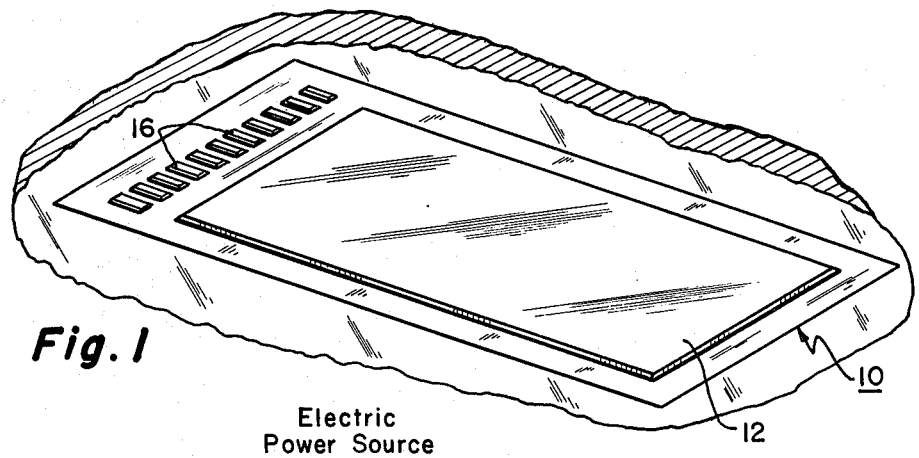
Figure 2:
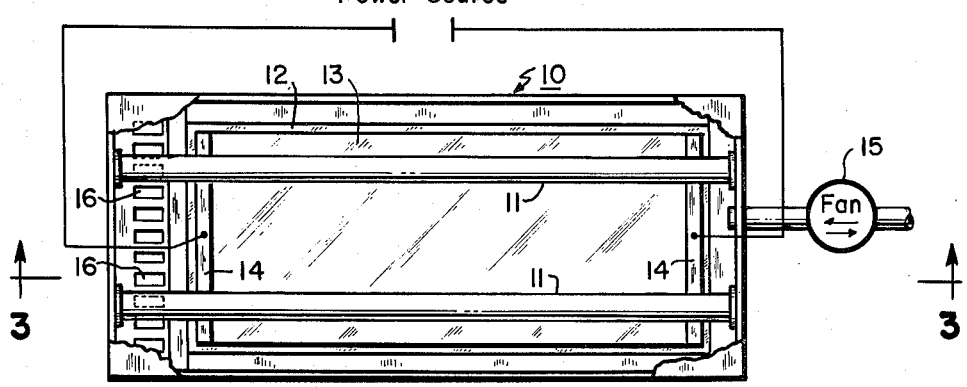
Figure 3:
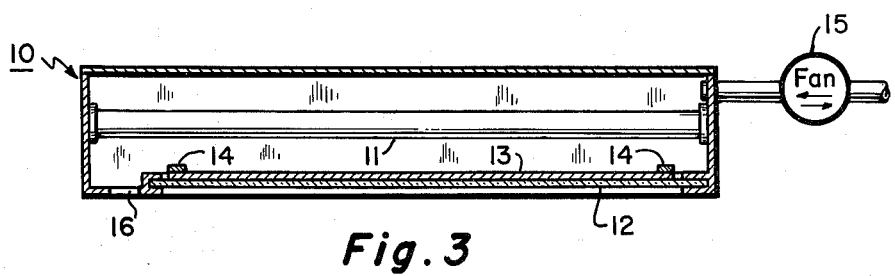

The invention will be described with reference to the accompanying drawing, in which:

FIGURE 1 is a view of a fixture according to the invention mounted in a ceiling, FIGURE 2 is a top plan view of the fixture of FIGURE 1, with the top panel of the housing cut away to permit the interior of the fixture to be viewed, and FIGURE 3 is a sectional view taken on line 3—3 of FIGURE 2.

Referring to the drawing, the lighting fixture of the invention comprises housing 10 supporting fluorescent bulbs 11 and having an opening across which is located glass panel 12. Panel 12 has thereon an electrically conducting, heat-reflecting coating 13, which may be any such coating known in the art, for example, a coating comprising the oxides of tin and antimony in the ratio of 99.6:0.4 and having a thickness of about 0.54 micron. Such coatings are well known, and their deposition and characteristics are described, for example, in United States Patent 2,564,708, issued to J. M. Mochel. In contact with coating 13 are silver electrode strips 14, which are connected to a suitable source of electrical power, as illustrated in FIGURE 2. A reversible fan 15 communicates with the interior of housing 10, and ventilating openings 16 are provided in housing 10 at its end opposite from fan 15 such that the air flow path will be essentially through the entire housing.

The operation of the device is as follows:

When bulbs 11 are illuminated, the light therefrom passes through glass panel 12 and transparent coating 13. Since coating 13 has the ability to reflect radiations in the infrared portion of the spectrum, most of the heat emitted from bulbs 11 is reflected back into the interior of housing 10. If fan 15 is operated to exhaust air from a room interior through the interior of the housing, the effect will be to produce space lighting with a minimum of concomitant heating. If some heating is desired, the direction of fan 15 may be reversed, and air projected into the housing by the fan will be emitted through openings 16 and will carry therewith to the room interior the heat which would otherwise be trapped in the fixture. If maximum heating is desired, in addition, an electrical current is passed through coating 13 by means of the illustrated electrical power source. The heat produced by the passage of an electrical current through coating 13 is partly radiated through the glass panel and into the room, and partly radiated into the interior of the fixture and subsequently projected into the room through outlets 16 by means of fan 15. The result is an extremely efficient heating means which utilizes substantially the total energy emitted by bulbs 11, both the heat energy and the light energy produced thereby, and in addition supplements this energy by the heat energy emitted by electrically conducting coating 13 when an electrical current is passed through the coating.

Additional features of the present fixture include its ability to provide ventilation alone if fan 15 is operated in the absence of the application of power to bulbs 11 and coating 13, and the provision of heating without light if power is applied to coating 13 but not to bulbs 11. The latter feature may be provided in a fixture according to the present invention which omits the presence of bulbs 11.

The above description has been provided only as that of a preferred embodiment of the invention. Accordingly, it is intended that the scope of the invention be limited only by the scope of the appended claims.

What is claimed is:

1. A combination fixture comprising a housing having a light source therein, said housing having an opening containing therein an electrically conducting panel which is substantially transparent to visible radiation but which reflects a substantial part of heat radiation falling thereon, means for passing an electrical current through said panel and means for passing air through said housing.

2. A combination fixture comprising a housing having a light source therein, said housing having an opening containing therein a light-transmitting panel having thereon an electrically conducting coating which is substantially transparent to visible radiation but which reflects a substantial part of heat radiation falling thereon, means for passing an electrical current through said coating and means for passing air through said housing.

3. A combination ceiling fixture comprising a light source, beneath said light source an electrically conducting panel which is substantially transparent to visible radiation but which reflects a substantial part of heat radiation falling thereon, means for passing an electrical current through said panel, and means for passing air over said panel and around said light source.

4. A combination ceiling fixture comprising a housing having a light source therein, said housing having a bottom opening containing therein a light-transmitting panel having thereon an electrically conducting coating which is substantially transparent to visible radiation but which reflects a substantial part of heat radiation falling thereon, means for passing an electrical current through said coating, and means for passing air through said housing.

5. A combination ceiling fixture comprising a housing having a light source therein, said housing having a bottom opening containing therein a light-transmitting panel having thereon an electrically conducting coating which is substantially transparent to visible radiation but which reflects a substantial part of heat radiation falling thereon, means for passing an electrical current through said coating, a reversible fan communicating with the interior of said housing at an end thereof and an aperture in said housing at its end opposite said fan allowing the flow of air between said interior of said housing and a space beneath said fixture.

References Cited by the Examiner
UNITED STATES PATENTS

| 2,700,095 | 1/55 | Needham | 219—345 X |
| 2,845,855 | 8/58 | Burns | 240—78 X |
| 3,097,287 | 7/63 | Knoll et al. | 240—2 X |

NORTON ANSHER, Primary Examiner.

EVON C. BLUNK, Examiner.